Aug. 14, 1956     C. H. CLAUSEN     2,758,673
LUBRICANT DISTRIBUTOR
Filed July 7, 1954
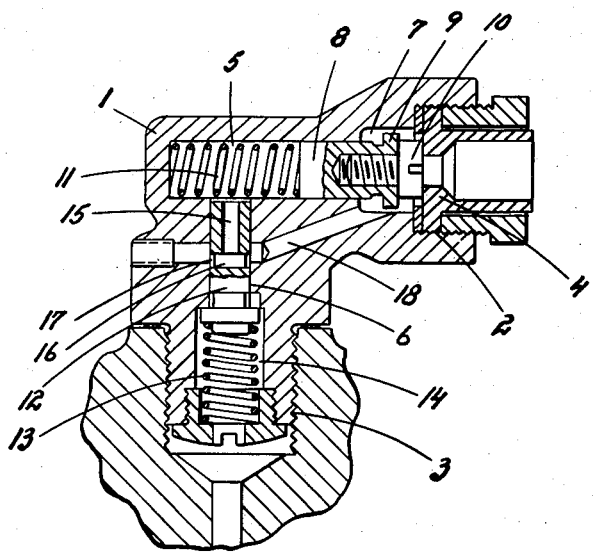
INVENTOR
CARL HERMAN CLAUSEN 2,758,673

LUBRICANT DISTRIBUTOR

Carl Herman Clausen, Stockholm, Sweden, assignor to Atvidabergs Sparvaxlar & Signalfabriks A. B., Stockholm, Sweden, a corporation of Sweden Application July 7, 1954, Serial No. 441,714

Claims priority, application Sweden July 8, 1953

1 Claim. (Cl. 184—7)

The present invention relates to a lubricant distributor which is adapted on each pressure stroke of a feed pump to feed a portion of lubricant to one or more lubricating points. The essentially characteristic features of the distributor are that it comprises a pump piston and a valve slide piston which are each displaceably disposed in a cylinder, which cylinders are disposed in series, the cylinder of the valve piston slide being disposed closest to the lubricating point, that the end of the pump piston which is remote from its cylinder and consequently faces the feed pump is adapted to be actuated by the pressure generated by the feed pump and existing in a chamber outside it, that the pump piston cooperates with a spring which tends to move the said piston in a direction out of its cylinder against the action of the pressure existing in the chamber, that the valve piston slide, the inner end of whose cylinder is in communication with the inner end of the pump piston cylinder and whose outer end is connected to the lubricating point, is provided with a spring which tends to move the said slide in a direction into its cylinder, that the chamber is connected through a passage or the like to the cylinder of the valve piston slide, which passage is adapted to cooperate with passages or the like formed in the valve piston slide, the valve piston slide both permitting the feed of the lubricant to the inner end of the pump piston cylinder and permitting the feed of said lubricant by means of the pump piston to the lubricating point.

For the better understanding of the invention a preferred embodiment thereof as applied to a lubricant distributor will now be described by way of example with reference to the accompanying drawing showing a longitudinal section of a lubricant distributor in accordance with the invention.

1 designates the housing of the lubricant distributor, which is provided with an interior threaded portion 2 and an exterior threaded portion 3. The portion 2 is intended to be connected by means of a pipe line provided with a fitting 4 to a lubricant pump which can be either operated by hand or by a machine. The portion 3 is meant to be threaded fast to the place where lubrication is to take place.

The housing 1 is provided with a pair of bores 5 and 6 serving as cylinders. In one bore 5, which opens into a chamber 7 disposed inside the portion 2, there is disposed a pump piston 8, which is provided both with a head 9 which is adapted, when the piston 8 occupies its inner end position, to abut against the end surface of the cylinder 5 facing the chamber 7, and with a screw 10 or a similar means which is adapted, when the piston 6 is in its outer position, to abut against the fitting 4 or a corresponding abutment. The pump piston 8 cooperates with a spring 11 which tends to move it out of the cylinder 5 against the pressure existing in the chamber 7.

The other bore 6 serving as a cylinder is connected to the cylinder 5 inside the inner end position of the pump piston 8, so that the said cylinders 5 and 6 are in perpetual communication with each other. In the cylinder 6 there is disposed a valve piston slide which cooperates with a spring 13 tending to move the piston 12 towards the cylinder 5. The end of the cylinder 6 which is remote from the cylinder 5 is connected through a passage 14 to the lubricating point.

The valve piston slide 12 is provided with a central passage 15 starting from its end facing the cylinder 5 and opening into a diametral passage 16 disposed adjacent the other end of the piston 12, said passage 16 opening in turn into a groove 17 formed in the peripheral surface of the piston 12. When the valve piston slide 12 occupies its inner end position the groove 17 is substantially opposite a passage 18 or the like, which starts from the chamber 7.

The lubricant distributor according to the drawing functions in the following way: When a pressure stroke from the feed pump is finished and the supply line is unloaded the piston means 8 and 12 occupy the position shown in the drawing. Then, when the chamber 7 is supplied with lubricant, e. g. oil or tender fat, on a new pressure stroke from the feed pump and is thus placed under pressure, the pump piston 8 cannot at first move since the same pressure exists at its two sides because the chamber 7 is in communication with the cylinder chamber 5 through the passage 18, the groove 17 and the passages 16 and 15. The valve piston slide 12 moves however out of the cylinder 6 actuated by the said pressure until the communication between the groove 17 and the passage 8 is broken. Then when the pressure in the chamber 7 increases further, the pump piston 8 is moved thereby against the action of the spring 11 into the cylinder 5, the lubricant in the cylinder chamber 5 pressing the valve piston slide 12 further out of the cylinder 6 so that communication is presently obtained between the cylinder chamber 5 and the passage 14 through the intermediary of the passages 15 and 16 and the groove 17. Lubricant will thereby be pumped to the lubricating point at the continued motion of the pump piston 8 towards the interior of the cylinder 5. This continues until the head 9 of the piston 8 abuts against the end surface of the cylinder 5. Thereupon the supply line and the chamber 7 are unloaded, the piston means 8 and 12 once more occupying the position shown in the drawing, and new lubricant is sucked into the cylinder 5.

By changing the stroke of the pump piston 8 the quantity of lubricant pumped to the lubricating point can be changed. In such a case either screws 10 having different kinds of heads or rings of various thicknesses under the head of the abutment screw 10 can be used.

According to the shown embodiment of the lubricant distributor according to the invention, the cylinders 5 and 6 are disposed at right angles to each other. However, nothing prevents these from being placed in another way, e. g. coaxially one after the other.

The invention is not limited to the features described above and shown in the drawing but can be varied in several ways within the scope of the appended claim.

What I claim and desire to secure by Letters Patent is:

A lubricant distributor comprising a body having two cylindrical bores therein, the second bore having one end in communication with the first bore, said body having an outlet chamber into which the other end of said second bore opens, said body having an inlet chamber into which one end of said first bore opens, said body further having a passage connecting said inlet chamber and said second bore, a first piston slidable in said first bore having stop means thereon limiting its movement into said bore and having adjustable stop means thereon limiting its movement out of said bore, first spring means in said first bore urging said first piston toward said inlet chamber, a second piston slidable in said second bore having stop means thereon limiting its movement into said second bore and having a central passage therein extending from the end thereof adjacent said first bore and opening out of the side of said second piston adjacent said passage from said inlet chamber, and spring means in said outlet chamber urging said second piston toward said first bore.

References Cited in the file of this patent

UNITED STATES PATENTS 2,556,968 Jakobsen June 12, 1951